HYBRID TYPE FILTER NETWORKS

Filed July 2, 1956

Inventor
David I. Kosowsky
by Robert S. Topenzer Atty.

United States Patent Office 2,913,682

Patented Nov. 17, 1959

2,913,682

HYBRID TYPE FILTER NETWORKS

David I. Kosowsky, West Newton, Mass., assignor to Hermes Electronics Co., Cambridge, Mass., a corporation of Delaware Application July 2, 1956, Serial No. 595,179

3 Claims. (Cl. 333—72)

This invention relates to radio frequency wave filters and, in particular, it relates to crystal filters formed with hybrid coils in a pseudo-lattice configuration.

Because of its inherent generality, the symmetrical lattice is especially well suited for bandpass crystal filter applications, and indeed most bandpass filters, incorporating piezoelectric crystals as frequency selective elements, have this configuration or its equivalent. Such a filter may include two pairs of crystals per section, a first pair of identical crystals being arranged in the respective series arms of the lattice and a second pair of identical crystals being arranged in the respective shunt arms. The difficulty with this arrangement is that extraordinarily care is required to match the crystals sufficiently closely, and therefore it is usually the practice to employ a divided plate crystal, that is, a crystal wherein the plating for each electrode is divided into two electrically insulated areas, in place of each matched pair of crystals. This expedient, although satisfactory at lower frequencies, is impractical at relatively high frequencies, because of practical difficulties in performing the electrode division, and then, too, it is relatively costly. The equivalent of the lattice or pseudo-lattice formed with a hybrid coil avoids these difficulties, and it is to an improvement of crystal filter networks of this latter type that the present invention is directed.

Figure 1:
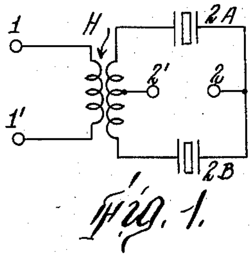
Fig. 1 is a schematic diagram of a conventional single section pseudo-lattice or hybrid type crystal filter network.

With reference now to the drawing, there is illustrated in Fig. 1 a conventional hybrid type crystal filter network for narrow pass band applications. As shown, this network comprises a three-winding hybrid coil H and a pair of crystals 2A and 2B whose characteristics determine the attenuation characteristics of the network. The input of the network is constituted by a pair of terminals 1, 1′ connected to the primary winding of the hybrid, and the output of the network is constituted by a pair of terminals

2, 2′, the former being connected to the junction of the crystals 2A and 2B, and the latter being connected to the junction of the balanced secondary windings of the hybrid.

Figure 2:
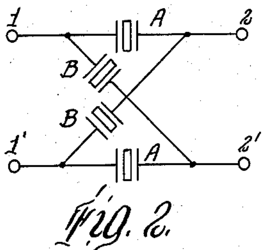
Fig. 2 is a schematic diagram of the lattice equivalent of the network of Fig. 1 in idealized form.
Figure 3:
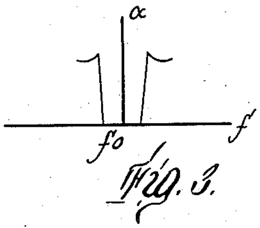
Fig. 3 is a graph of the attenuation characteristic of the networks of Figs. 1 and 2.

If the hybrid transformer is idealized, that is considered to have windings of infinite inductance and unity coupling (between the primary and secondary windings and between the individual secondary windings themselves), and if the total number of turns on the secondary winding is twice that of the primary winding, it can be shown that the lattice network of Fig. 2 is in all respects equivalent to the network of Fig. 1. As shown in Fig. 2, this network comprises a pair of identical crystals A in the respective series arms of the lattice and a pair of identical crystals B in the respective shunt arms. Crystals A and B are like the crystals 2A and 2B of the network of Fig. 1, respectively, except that their impedance is one half that of crystals 2A and 2B, as the notation indicates. Even though an idealized form of hybrid transformer is unrealizable in practice, both the networks of Figs. 1 and 2 exhibit substantially the same attenuation characteristics. Fig. 3 illustrates the attentuation characteristic $\alpha$ of these networks as a function of frequency $f$.

Figure 4:
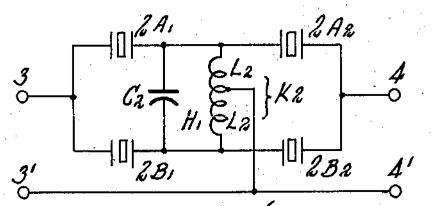
Fig. 4 is a schematic diagram of a conventional two-section hybrid type crystal filter network.

In Fig. 4 there is illustrated a crystal filter network comprising essentially two of the sections of Fig. 1 but having only one hybrid $H_1$ with a single pair of balanced windings. Thus, a first pair of crystals $2A_1$, $2B_1$ in series combination are connected across the ends of the hybrid windings along with the series combinaiton of a second pair of crystals $2A_2$, $2B_2$. A terminal 3 connected to the junction of crystals $2A_1$, $2B_1$ and a terminal 3′ connected to the junction of the hybrid windings constitute the input circuit of the network. The output circuit is constituted by a pair of terminals 4, 4′, the former being connected to the junction of crystals $2A_2$, $2B_2$ and the latter being connected to the same point as terminal 3′. A capacitor $C_2$ is also provided across the hybrid windings to resonate in the pass band with the coupled inductances $L_2$ thereof so that these inductance values will not affect, appreciably, the characteristics of the network that are of interest.

Figure 5:
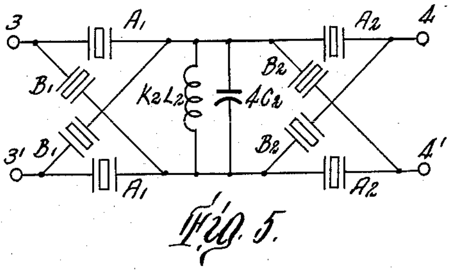
Fig. 5 is a schematic diagram of the lattice equivalent of the network of Fig. 4 in idealized form.
Figure 6:
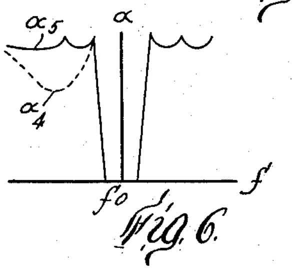
Fig. 6 is a graph of the attenuation characteristic of the networks of Figs. 4 and 5.
Figure 8:
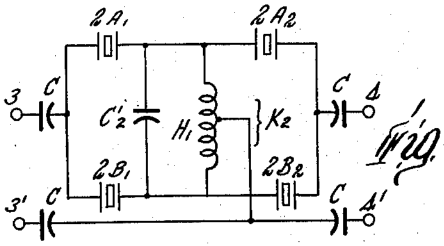
Fig. 8 is a schematic diagram of a two-section hybrid type crystal filter network according to the invention.

If it be assumed that the hybrid $H_1$ has a unity coupling coefficient $K_2$ between windings, the lattice equivalent of the network of Fig. 4 is as shown in Fig. 5, crystals $A_1$, $B_1$, $A_2$ and $B_2$ having one half the impedance of their counterparts in the hybrid type network of Fig. 4. Although, as aforementioned, the attenuation characteristics of the networks of Figs. 1 and 2 roughly correspond to one another even though an ideal hybrid coil is not realizable in practice, the attenuation characteristic $\alpha_4$ of the network of Fig. 4, it has been found, does not measure up to that of the network of Fig. 5. This is shown in Fig. 6 where the attenuation characteristic $\alpha_4$ as a function of frequency $f$ is represented by the dotted line, and the attenuation characteristic $\alpha_5$ of the network of Fig. 5 is represented by the solid line. With reference to Fig. 6, it will be observed that a marked decrease in the attenuation characteristic $\alpha_4$ occurs in the stop band adjacent the lower end of the pass band. Because of its proximity to the pass band, this decrease or dip is particularly undesirable since it degrades the specification of maximum attenuation correspondingly when the network of Fig. 4 is employed instead of the network of Fig. 5. The hybrid type network according to the invention, as illustrated in Fig. 8, avoids this disadvantage, permitting the full capabilities of the lattice configuration to be realized.

Figure 7:
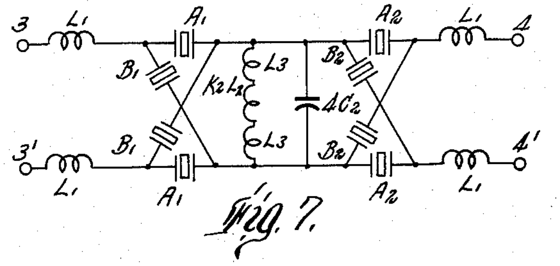
Fig. 7 is a schematic diagram of the lattice equivalent of the network of Fig. 4 in more complete form.

To show why this is so, it is necessary first to analyze the network of Fig. 4 in more complete form, taking into account normal coupling values between windings of the hybrid coil $H_1$ as determined by their respective leakage inductances. In Fig. 7 where such complete form of lattice equivalent of the network of Fig. 4 is illustrated, it will be observed that due to the leakage inductances of the hybrid windings, inductances $L_3$ appear in series combination with the coupled inductance $K_2L_2$, and inductances $L_1$ appear in each terminal line of the network where:

$$L_1=\frac{L_2}{2}(1-k_2) \text{ and } L_3=\frac{L_2}{4}(1-k_2)$$

If the coefficient of coupling between the windings $k_2$ were unity, it is evident that $L_1$ and $L_3$ would vanish, reducing the network to the idealized form of Fig. 5. In practice, however, $k_2$ usually has a value from between 0.80 to 0.95 which establishes the value of $L_1$ in the range between $.1L_2$ and roughly $.01L_2$. Such values of inductance $L_1$ provide an inductive reactance in the region just below the pass band which is comparable to the reactance of the idealized form of network of Fig. 4 or its equivalent of Fig. 5. That is to say, when the network of Fig. 5, for example, is operated under normal conditions, such as image impedance conditions with resistive terminations at either end, the respective input and output impedances of the network can be shown to have a reactive component substantially equal to the reactance $2\omega L_1$ produced in the input and output circuits due to the leakage inductances of the hybrid windings, where $\omega$ equals $2\pi f$. Since the former is capacitive in this region, a series resonance effect is apparently produced by the leakage inductances which accounts for the degradation in the attenuation $\alpha_4$. In the network of Fig. 8, the leakage inductances characterized by $L_1$ and $L_3$ are neutralized, permitting the attenuation characteristic $\alpha_5$ to be realized with a hybrid type network.

With reference once again to Fig. 8, it will be observed that the critical distinction between this network and the network of Fig. 4 is that a capacitor C is provided in each terminal line of the network of Fig. 8 to resonate with the apparent or virtual inductances $L_1$ at the pass band center frequency $f_0$ or thereabouts. Thus, if $$\frac{1}{2\pi fC}$$

is equal to $2\pi fL_1$ when $f$ equals $f_0$, the effect of the inductances $L_1$ will be eliminated. Since crystal filters are generally narrow band anyway, that is the band width is usually less than 0.8% of the center frequency, the same holds true as a practical matter about so much of the pass band as is usually of interest. If then $C_2'$ is assigned a value which takes into account inductances $L_3$ as well as coupled inductances $K_2L_2$, it has been found that the network of Fig. 8 has the same characteristics as that of Fig. 5 including substantially the same attenuation $\alpha_5$.

Figure 9:
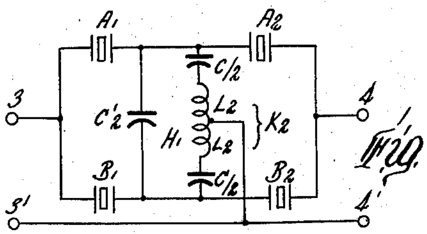
Figs. 9 and 10 are simple variations of the network of Fig. 8 also in accordance with the invention.
Figure 10:
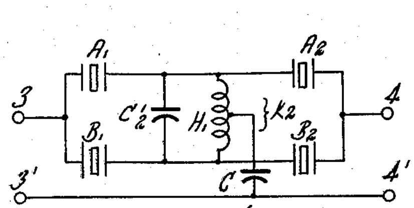
Figure 11:
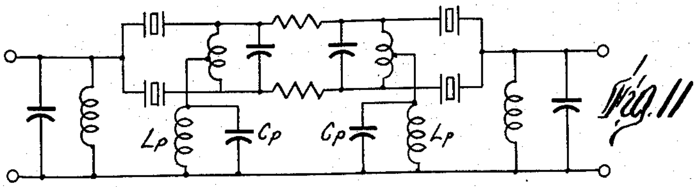
Fig. 11 is a schematic diagram of another two-section hybrid type crystal filter network also in accordance with the invention.

Figs. 9 and 10 illustrate variations of the network of Fig. 8. In Fig. 9 two capacitors $$\frac{C}{2}$$

are employed in series with the respective hybrid windings, capacitors $$\frac{C}{2}$$

being exactly half the size of capacitors C as the notation indicates. Fig. 11 illustrates still another variation wherein only a single capacitor C is provided between the junction of the hybrid windings and the common terminals 3' and 4'. Those skilled in the art will recognize that despite the slightly different appearances of the networks of Figs. 8 through 10, the same are the exact equivalents of one another.

Like considerations are applicable to a wide band crystal filter except that more precise means must be provided to eliminate the effects of the hybrid winding leakage inductances, owing to the substantially larger frequency region of interest. Thus, as shown in Fig. 11, inductance and capacitance combinations of $L_p$ and $C_p$ are provided between the respective junctions of the hybrid windings (two hybrids are required in this conventional form of wide band crystal filter) and the common terminals 3' and 4'. If then the values of the inductance $L_p$ and capacitance $C_p$ are assigned such that their combined reactance characteristic as a function of frequency is equal and opposite to that of the inductance $2L_1$ over the frequency region of interest, it is evident that the same beneficial results will be obtained in the wide band filter case as in the narrow band filter case. Various such modifications as this to meet the peculiar requirements of other conventional hybrid type crystal filter networks which are nevertheless within the spirit and scope of the invention will no doubt occur to those skilled in the art, and therefore what is claimed is:

1. In a hybrid type, band selective, crystal filter network having a transformer with at least a pair of balanced windings, the combination with said transformer of a capacitive circuit effectively connected in series with said balanced windings to series resonate in the vicinity of the selection band with the virtual inductances produced by the leakage inductances of the balanced windings, thereby to enhance the attenuation characteristics of the filter network.

2. In a hybrid type, band selective, crystal filter network having a transformer with at least a pair of balanced windings, the combination with said transformer of a capacitor $$\left(\frac{C}{2}\right)$$

effectively connected in series with each balanced winding and having a value which is related to the virtual inductances $L_1$ produced by the leakage inductances of the balanced windings according to the formula $$\frac{1}{4\pi f_0\left(\frac{C}{2}\right)}=2\pi f_0 L_1$$

where $f_0$ is the selection band center frequency of the filter network.

3. In a hybrid type, band selective, crystal filter network having input and output terminals and a transformer with at least a pair of interconnected balanced windings, the combination with said transformer of a capacitor C connected between the point of interconnection of the balanced windings and one of said output terminals and having a value which is related to the virtual inductances $L_1$ produced by the leakage inductances of the balanced windings according to the formula $$\frac{1}{2\pi f_0 C}=2\pi f_0 L_1$$

where $f_0$ is the selection band center frequency of the filter network.

References Cited in the file of this patent

UNITED STATES PATENTS

| | | |
|---|---|---|
| 2,169,301 | Sykes | Aug. 15, 1939 |
| 2,266,658 | Robinson | Dec. 16, 1941 |
| 2,278,801 | Rust et al. | Apr. 7, 1942 |
| 2,333,148 | Botsford | Nov. 2, 1943 |